United States Patent [19]

Harton

[11] Patent Number: 5,689,345

[45] Date of Patent: Nov. 18, 1997

[54] APPARATUS FOR TESTING AMPLIFIER FOR ELECTROMECHANICAL GRAVURE ENGRAVING MACHINE

[75] Inventor: Lester H. Harton, Newton, N.C.

[73] Assignee: R. R. Donnelley & Sons, Chicago, Ill.

[21] Appl. No.: 594,821

[22] Filed: Jan. 31, 1996

[51] Int. Cl.⁶ .................... B41C 1/04; G01R 31/00
[52] U.S. Cl. ........................... 358/299; 330/2
[58] Field of Search .................. 358/299; 330/2

[56] References Cited

U.S. PATENT DOCUMENTS

| | | |
|---|---|---|
| 2,843,747 | 7/1958 | Ashley . |
| 2,978,655 | 4/1961 | Fernsler . |
| 3,124,036 | 3/1964 | Hell et al. ............. 88/24 |
| 3,405,365 | 10/1968 | Kobayashi . |
| 3,510,789 | 5/1970 | Berlinden . |
| 3,522,532 | 8/1970 | McCoy . |
| 3,581,198 | 5/1971 | Shoemaker et al. . |
| 3,582,549 | 6/1971 | Hell et al. ............. 358/299 |
| 3,688,033 | 8/1972 | Hell et al. . |
| 3,718,857 | 2/1973 | Bernard ............ 324/57 R |
| 3,833,856 | 9/1974 | Roeshlein ............. 330/2 |
| 4,344,028 | 8/1982 | Bank et al. ............ 324/57 N |
| 4,450,411 | 5/1984 | Spurr ............. 330/2 |
| 4,510,454 | 4/1985 | Sherman ............. 330/2 |
| 4,697,151 | 9/1987 | Butler ............. 330/2 |
| 4,896,118 | 1/1990 | Johnson ............. 330/2 |
| 4,937,535 | 6/1990 | Underwood et al. ......... 330/2 X |
| 5,006,812 | 4/1991 | Erickson ............. 330/2 |
| 5,045,802 | 9/1991 | Miyake et al. ............ 330/2 |
| 5,239,693 | 8/1993 | Gailus et al. ............ 330/2 X |
| 5,404,109 | 4/1995 | Pribble et al. ............ 330/2 X |
| 5,410,265 | 4/1995 | Jain et al. ............ 330/2 |

FOREIGN PATENT DOCUMENTS

| | | |
|---|---|---|
| 58-153577 | 3/1985 | Japan . |
| 3 175317 | 7/1991 | Japan . |
| 1594460 A | of 1991 | U.S.S.R. . |
| 16 79 423 A1 | 9/1991 | U.S.S.R. . |

OTHER PUBLICATIONS

"Gravure platemaring and cylinder making," *Printing*, McGraw Hill Encyclopedia, 6th Ed., vol. 14, pp. 291–301, publication date: 1987.

Tom Annes, "fourteen Ways to Use R–E's Tone–Burst Generator," *Radio Electronics*, Aug. 1971, pp. 32–35.

T. B. Tomlinson, "video Amplifier Testing—Using a Square Wave Generator," *Electronic Engineering*, Jun. 1949, pp. 204–208.

A. Garcia, "Function Generators," Rev. Esp. Electron. Spain, vol. 24, No. 273–274 (Aug.–Sep. 1977).

Op–Amp Overload Indicator, R. W. Darlington, Design Focus, vol. 13, No. 17, Sep. 2, 1980.

Math's Notes, Irwin Math, CQ Radio Amateur Journal, vol. 35, No. 4, pp. 37–39, Apr. 1979.

*Primary Examiner*—Eric Frahm
*Attorney, Agent, or Firm*—Fitch, Even, Tabin & Flannery

[57] ABSTRACT

A test apparatus for generating switch tests, step tests, or digital ramp test signals to be input to an engraving amplifier for off-line testing includes a multiple timing signal generator which is used to supply signals for driving the engraving amplifier, and includes a switch tester for parallel loading selected digital signals for serial conversion and outputting in a serial data stream to the engraving amplifier. A step test facility is also provided whereby a pair of digital values are alternately parallel loaded into a parallel to serial converter and output to an engraving amplifier to provide a digital step stimulus. A ramp test circuit is also provided wherein a counter has its output selectively coupled to one of the parallel to serial converters for supply through a driver to the engraving amplifier to provide a digital ramp signal.

5 Claims, 6 Drawing Sheets

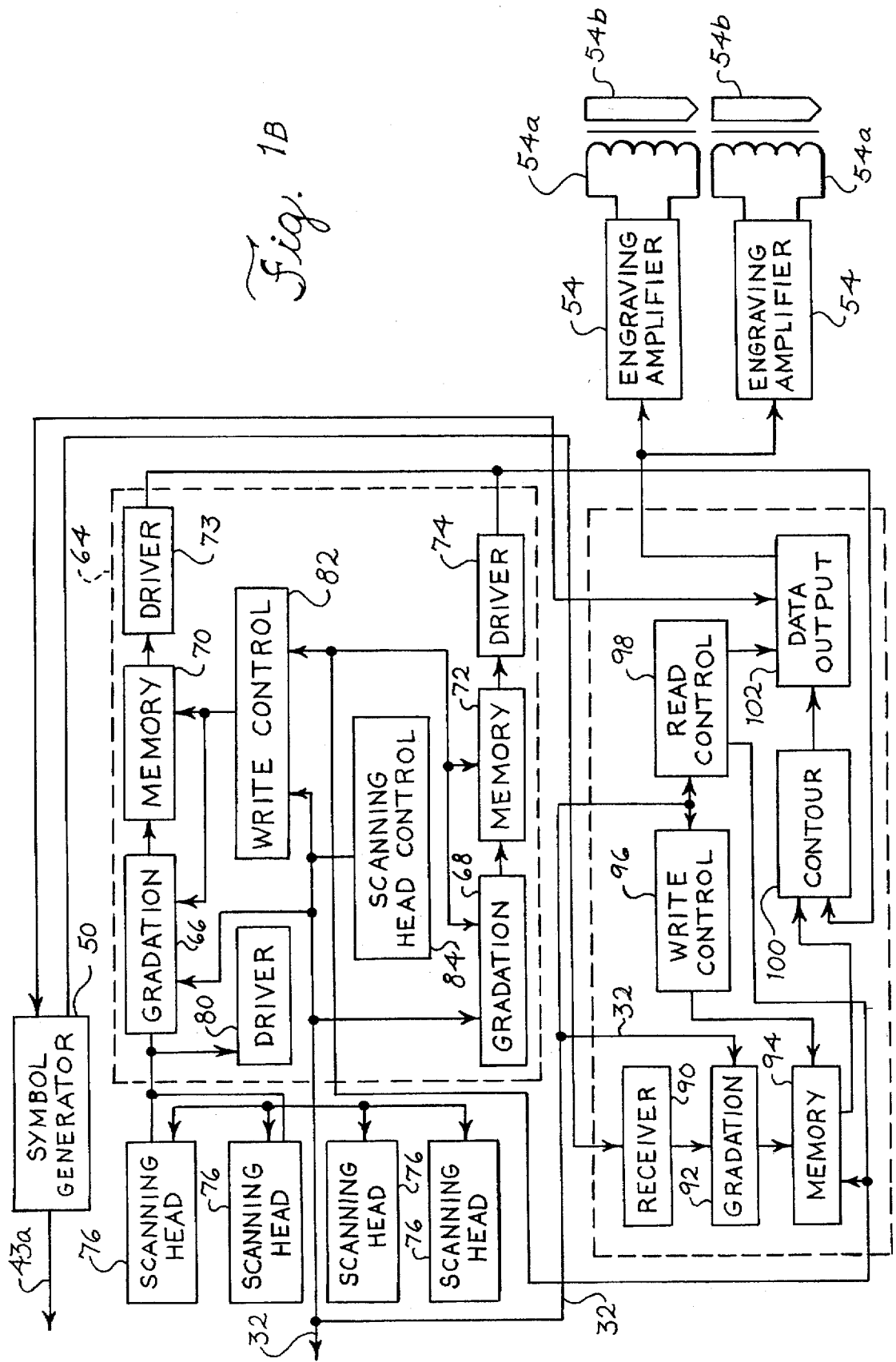

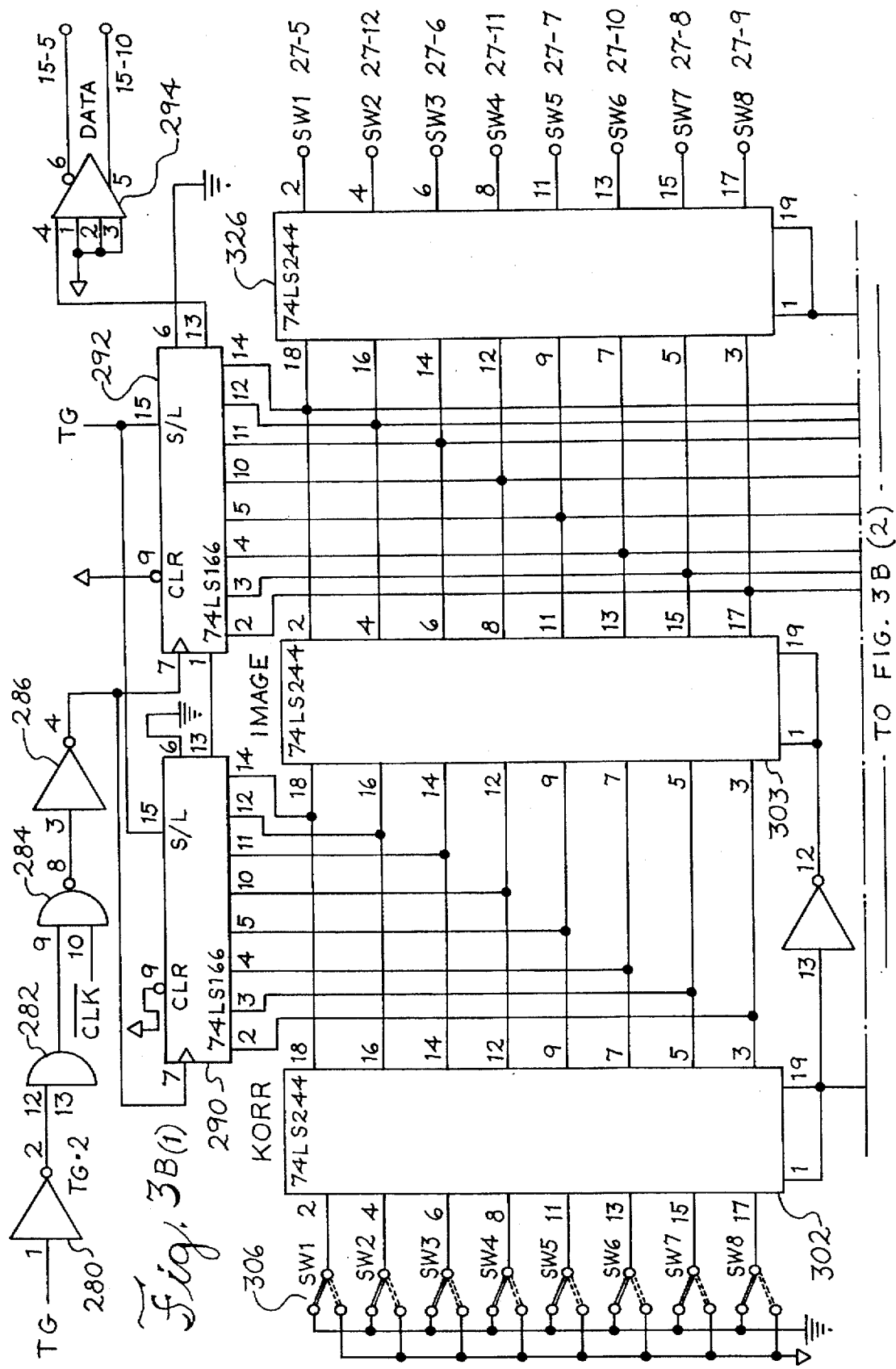

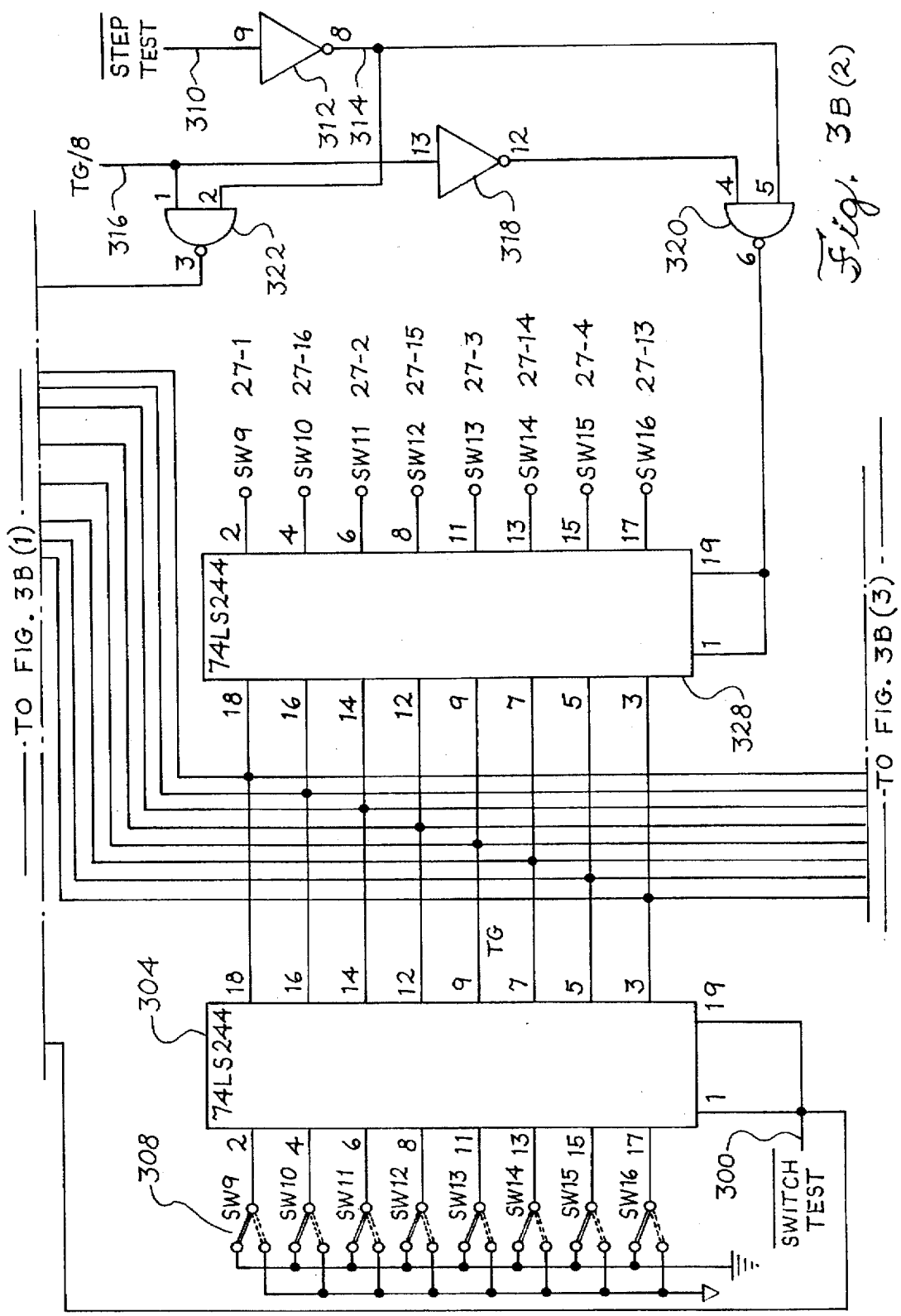
Fig. 3B(2)

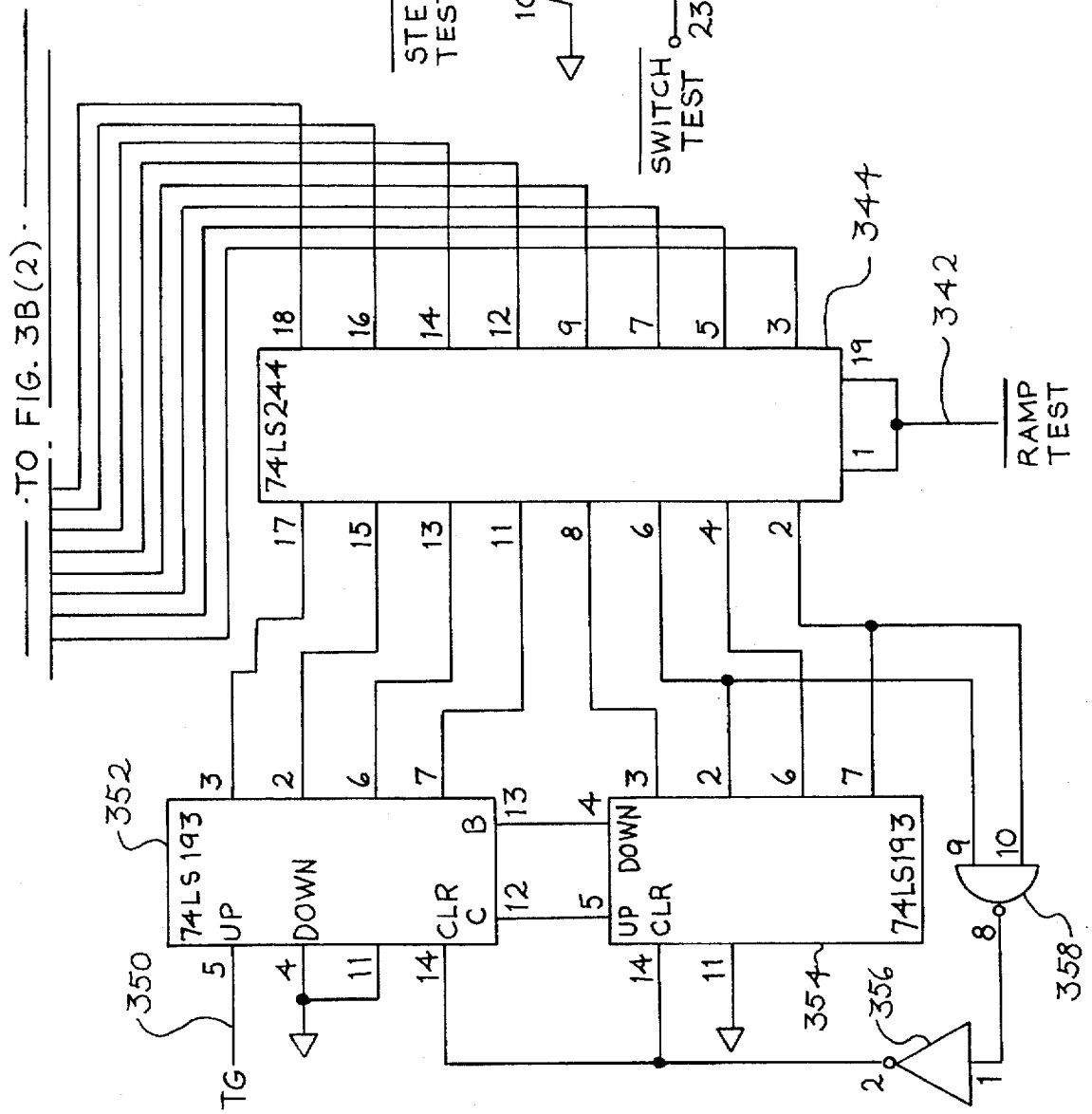
Fig. 3B (3)

APPARATUS FOR TESTING AMPLIFIER FOR ELECTROMECHANICAL GRAVURE ENGRAVING MACHINE

BACKGROUND OF THE INVENTION

The field of the invention relates in general to digital systems for providing testing signals to a digital amplifier, and in particular to a system for providing digital signals to an engraving amplifier for driving a diamond stylus in an electromechanical gravure engraving machine for engraving gravure plates for printing.

Printing of newspapers, books, labels, and the like may be carried out using a number of methods such as offset, lithography, and gravure. Gravure printing, also known as rotogravure, is carried out principally on web presses employing etched or engraved cylinders. Gravure is particularly attractive for long printing runs wherein high-quality printing is needed and may, for instance, be used for printing magazines, mail-order catalogs, brochures, newspaper supplements, and comics. Gravure is also used to print packaging, including folding cartons and flexible packages, polyethylene bags, floor covering, vinyl upholstery, plastic laminates, and the like. Various gravure cylinder-making processes are available.

In the past, conventional gravure plate-making was carried out using a bichromate sensitized carbon tissue or transfer film that is contact printed through a continuous tone positive film onto a clean copper surface of a gravure plate or cylinder. One of the problems with such chemical processes is repeatability and convenience of use. In addition, if such a wet chemical process is used, the chemical by-products must be disposed of in an environmentally safe way.

Accordingly, systems have been developed for electromechanically engraving gravure plates. One such system, known as the Helioklischograph system, uses an engraving stylus consisting of a diamond and includes a system having a scanning drum with a scanning head associated with it for providing signals to an engraving head having a stylus connected to it which engraves a cylinder on a recording drum as shown in U.S. Pat. No. 3,582,549 to Hell et al.

Significant improvements have been made over the Hell '549 system, in particular related to digital composition of images which are to be formed on the recording drum and have led to improvements in the Helioklischograph system. Such improved Helioklischograph systems conventionally include a video display terminal that communicates with a minicomputer, the minicomputer supplying control signals via control logic to an engraving amplifier. The engraving amplifier also receives an image data signal provided either by scanning heads or from a stored digital image via a symbol generator. The engraving amplifier produces a stylus signal that is fed to a voice coil type drive that is mechanically coupled to the stylus to cause it to engrave the image on a copper cylinder, or for certain long print run applications, a chrome plated copper plate. From time to time, such systems may operate out of specification or even fail to provide properly engraved plates. When this happens, it is desirable to be able to test rapidly subsections of the system.

One subsection which is often separately tested is the engraving amplifier. It is removed from the Helioklischograph system for bench testing. A replacement engraving amplifier is then substituted into the Helioklischograph system. The engraving amplifier to be tested is then usually supplied input signals from the minicomputer used with the engraving system. The minicomputer, however, does not provide ramped signals for convenient testing of the stylus signal to be carried out. The failure to provide such signals makes more difficult the operator's interpretation of the state of the engraving amplifier. This may result in the operator expending more effort than might be otherwise desirable to diagnose the fault or fault in the engraving amplifier. A further disadvantage of such a test modality is that the Helioklischograph minicomputer is occupied during the testing period and cannot be used for production even if the engraving amplifier has been replaced.

What is needed is a system for generating the digital signals normally generated by the minicomputer, control logic and symbol generator of the Helioklischograph, or a subset thereof for supply to an engraving amplifier in a controlled manner so that the output of the engraving amplifier can be observed on an oscilloscope or the like to determine whether the engraving amplifier is responding properly to various digital input signals.

SUMMARY OF THE INVENTION

The present invention is directed to an apparatus for testing an amplifier which is used in an electromechanical gravure engraving apparatus. In particular it is designed for the off-line testing of an engraving amplifier which in the prior art would normally be tested by being stimulated by the output of selected digital signals from a Siemens-type R10 minicomputer. The system includes a clock-producing circuit which generates a 125 kilohertz timing signal, a 3.9 kilohertz timing signal, a clock signal, and a load signal, all supplied directly to the input terminals of the engraving amplifier. In addition, certain of the timing signals are connected to a multi-modal tester, which includes a selector. The selector may be used to select a switch test, a step test, or a ramp test. In the switch test mode, digital values loaded via a plurality of gang switches connected to latches are parallel loaded into the parallel inputs of parallel-to-serial converters, which parallel loaded digital signals are then clocked out as digital data through a driver to be supplied to the data terminals of an engraving amplifier under test. In the event that a step test is to be run, a pair of values are loaded into paired latches and the latches are alternately driven to output their parallel loaded signals through one of the parallel to serial converters causing a digital step response to be generated via a serial digital stream for supply to the engraving amplifier, causing the engraving amplifier to execute step changes which may then be measured at its output terminals. Finally, a ramp test facility is provided wherein a digital signal is ramped under the control of a counter, driven from one of the timing signals to cause the output data stream to be ramped up and ramped down. The ability to generate all three tests with relatively low-cost circuitry enables the user of the system to quickly and easily determine whether any faults have occurred in an engraving amplifier which is being off-line tested.

It is a principal aspect of the present invention to provide a digital stimulus signal for off-line testing of an engraving amplifier.

It is another aspect of the present invention to provide a multi-modal digital stimulus signal for testing of an engraving amplifier in an off-line mode.

Other aspects of the present invention will become obvious to one of ordinary skill in the art upon perusal of the following specification and claims in light of the accompanying drawings.

BRIEF DESCRIPTION OF THE DRAWINGS

FIGS. 1A and 1B are a block diagram of a gravure engraving system of the type used in the prior art and employing multiple engraving amplifiers for driving engraving styluses;

DETAILED DESCRIPTION OF THE PREFERRED EMBODIMENT

Figure 1A:
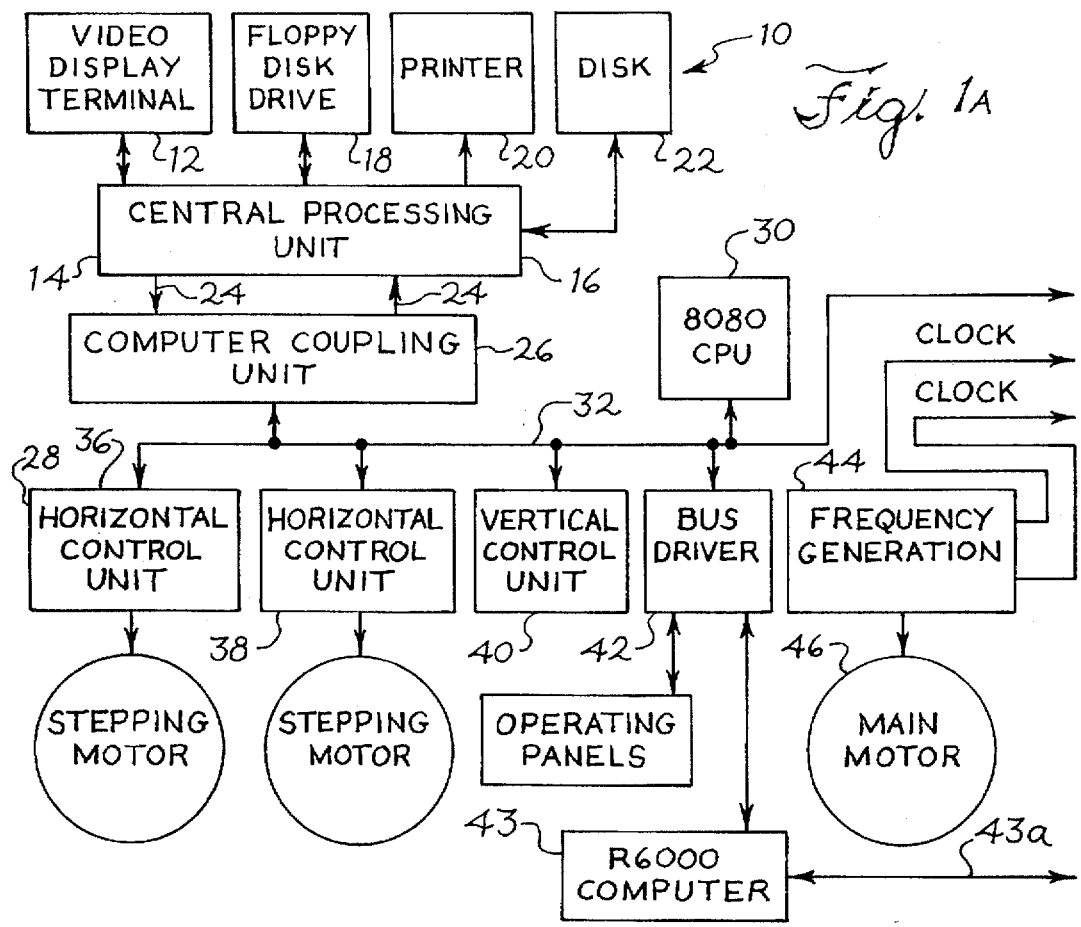

Referring now to the drawings, and especially FIGS. 1A and 1B, a prior art gravure engraving apparatus is generally shown therein and identified by the numeral 10. The gravure engraving apparatus includes a video display terminal 12 which communicates with an R-10 minicomputer 14 of the type sold by Siemens A. G., the computer 14 includes a central processing unit 16 having coupled thereto a floppy disk drive 18. A printer 20 is also connected as is a hard disk 22. The computer is connected via bus 24 to a computer coupling unit 26 in an overall control unit 28. The overall control unit 28 includes a microprocessor specifically an Intel 8080 coupled to a system bus 32 to which is also coupled the computer coupling unit 26. The bus 32 controls a horizontal control unit 36, a second horizontal control unit 38, a vertical control unit 40, a bus driver 42, an IBM R6000 RISC computer to which a symbol generator bus 43a is connected, and a frequency generator 44. The frequency generator 44 is coupled to a main motor 46 which drives an engraving drum. The symbol generator bus 43a is connected to a symbol generator 50 for transfer of image information or graphic symbols to and from an amplifier controller 52, having coupled thereto a plurality of engraving amplifiers 54. The engraving amplifiers 54 are connected to drive voice coil type inductors 54a which cause diamond styluses 54b to execute engraving motions.

The bus 32 is also coupled to a scanning unit 64 at a gradation unit 66, and a gradation unit 68. The gradation units have connected thereto memories 70 and 72, which are coupled through drivers 72 and 74 to drive portions of the engraving controller 52. A plurality of optical scanning heads 76 are connected to the gradation units 66 and 68 to input electrical signals thereto representative of the images on a drum which is being scanned. The gradation unit 64 also includes a driver as well as a right control 82 and a scanning head control 84. The right control 82 is coupled to the engraving amplifier controller 52. The symbol generator 50 is coupled to a receiver 90 in the engraving amplifier which supplies signals to a gradation unit 92 and through the gradation unit to a memory unit 94. A right controller 96 receives signals from the bus 32 and feeds them to the memory unit. A lead control 98 driven from the right control also inputs signals into the memory. Contour information is received by a contouring circuit 100 from the drivers 72 and 74 and in combination with the lead control provides a data output via a data output unit 102 to the engraving amplifiers 54.

Figure 2:
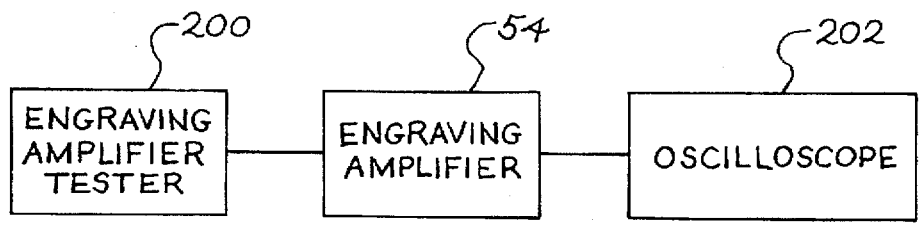
FIG. 2 is a block diagram of the inventive apparatus in combination with an engraving amplifier in a test set-up; and, FIGS. 3A and 3B are schematic diagrams of the engraving amplifier tester embodying the present invention.
Figure 3A:
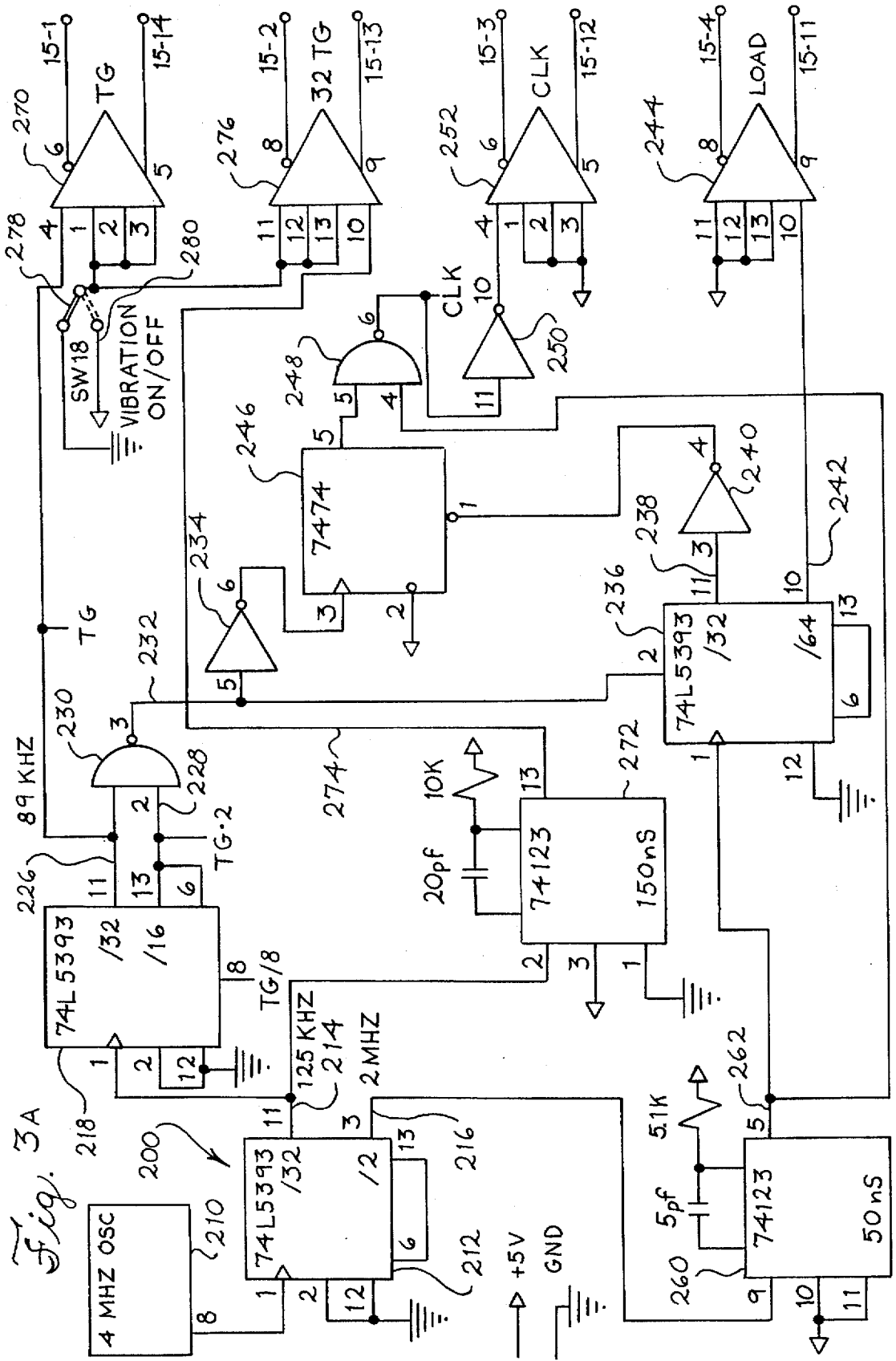

In the event that a failure of the system occurs, one or more of the engraving amplifiers 54 may be disconnected and coupled to an engraving amplifier tester 200 as shown in FIG. 2. The engraving amplifier 54 under test has its output connected to an oscilloscope 202 for reading of the outputs. Referring now to FIGS. 3A and 3B, the engraving amplifier tester 200 is shown therein in more detail and includes a 4 MHz oscillator 210 connected to a 74 LS 393 dual four-bit binary ripple counter 212 which produces a 125 kilohertz signal at a lead 214 and a 2 MHz signal at a lead 216. The 125 kilohertz signal is fed to another 74 LS 393 dual four-bit binary ripple counter 218 which down-converts the signal to a 3.9 kilohertz signal at a lead 220, and to a 7.8 kilohertz signal at a lead 228. Both of the signals are fed to a NAND gate 230 which provides an output on a lead 232 to an inverter 234. The NAND gate output 230 is also fed to another 74 LS 393 dual four-bit binary ripple counter 236 which divides the output signal by 32 and provides a divided signal and a lead 238 to an inverter 240. The counter counts up 16 pulses and then provides a LOAD enable signal. It also divides the signal from the NAND gate 230 by 64, and provides the output at a lead 242, to be fed to a LOAD driver 244 for output of a LOAD signal to the engraving amplifier 54. The engraving amplifier 54 receives the load signal and accepts digital data supplied by other portions of the engraving amplifier tester on receipt of the load signal. The inverters 234 and 240 feed their signals to a dual D-type flip-flop 246 which provides an output to a NAND gate 248 which is a clock-low signal. The clock-low signal is inverted by an inverter 250 and fed out through a clock-output driver 252 to the engraving amplifier 54 and to other portions of the circuit 200. The binary ripple counter 236 is also fed by a 74123 dual retriggerable monostable multivibrator 260 which receives the 2MHz signal and produces 50 nanosecond duration pulses on a lead 262 to the binary ripple counter 236. The 3.9 kilohertz signal is fed out through a TG driver 270 and the 125 kilohertz signal is fed to a 74123 dual retriggerable monostable multivibrator 272 which generates 150 nanosecond pulses on a lead 274 fed to the 32 TG driver 276 which produces a 125 kilohertz signal to be fed to the engraving amplifier 54 when the switch 278 is connected to the high voltage lead 280 enabling the drivers 270 and 276.

The TG signal 270 is also supplied to an inverter 280 and the 32 TG signal is supplied to a NAND gate 280T together with the inverted TG signal which are combined with the clock signal at a NAND gate 284 which drives an inverter 286 with a clocking signal supplied to a first 74 LS 166 parallel to serial shift register 290 and a second 76 LS 166 parallel to serial shift register 292. The serial shift registers are coupled in series to a data output driver 294 and their function will be described in detail hereinafter.

Three tests are provided by the system: a switch test, a step test and a ramp test. Each of the tests provides data consisting of two 8-bit bytes identified as image data and korr data. The korr data is fed to the korr parallel-to-serial converter 290 and the image data is fed to the image parallel-to-serial converter 292. In the event that a switch test is to be run, a potential is pulled low on a switch test lead 300, coupled to a 74 LS 244 latch 302 and a 74 LS 244 latch 304. The latch 302 has a plurality of manually settable switches 306, coupled to it to define a korr byte and the latch 304 has a plurality of manually settable switches 308 coupled to it to define the image byte. The signals are then fed to the parallel-to-serial converters 290 and 292 and clocked out as serial data through the data driver 294.

In the event that a step test is to be made, the lead 310 coupled to an inverter 312 is pulled low to drive the lead 314 high. The TG signal divided by 8 is fed to a lead 316 which is inverted by an inverter 318 and the signals are combined by a NAND gate 320. The raw TG/8 signal and signal from lead 314 are combined by a NAND gate 320 and fed to a 74 LS 244 latch 326. The NAND gate 320 drives a 74 LS 244 latch 328, causing the signals from the latches 326 and 328 to be alternately toggled to the korr and image parallel to serial converters 290 and 292 in synchronism with the TG/8 signal, thereby causing upward and downward steps to be generated in the output data stream 294 for testing the step response of the engraving amplifier 54. In the event that a ramp test is desired, the switch 340 pulls the ramp test lead 342 low which enables data to flow through a 74 LS 244 latch 344 to the korr and image parallel to serial converters 290 and 292. A 3.9 kilohertz TG signal is fed through a lead 350 to a 74 LS 193 presettable four-bit binary up/down counter 352. A second synchronous up/down flow clock counter 354 is coupled to the clear terminals of the counter 352 and driven at its clear terminals at the count of one hundred sixty via an inverter 356 coupled to a NAND gate 358 which is driven by the output pins of the counter 354. Thus the two counters, 352 and 354 together, count up when the power is applied to the counters as well as the TG signals and the counts are passed through the latch 344 when the latch is enabled by the ramp test signal 342 causing a ramp signal to be supplied. The use of the ramp signal allows the testing of the engraving amplifier by an oscilloscope 202 connected to it to be more easily performed, particularly for the determination of the output of a sine wave function.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. Apparatus for generating test signals for an engraving amplifier of the type used in an electromechanical gravure engraving apparatus, comprising:

means for generating a first engraving head vibration signal;

means during a first state for generating a static data signal;

means during a second state for toggling between two data states;

means during a third state for generating a digitized ramp data signal; and means for generating a serial data stream representative of at least one of the data signals, a clock signal and a load signal for supply to a digital engraving controller.

2. Apparatus for generating test signals for an engraving amplifier of the type used in an electromechanical gravure engraving apparatus according to claim 1, wherein said means for generating a first engraving head vibration signal comprises a digital signal generator.

3. Apparatus for generating test signals for an engraving amplifier of the type used in electromechanical gravure engraving apparatus according to claim 1, wherein said means for toggling between two data states comprises a pair of latches coupled to be alternately enabled to supply data signals to the means for generating a serial data stream.

4. Apparatus for generating test signals for an engraving amplifier of the type used in electromechanical gravure engraving apparatus according to claim 1, wherein said means for generating a serial data stream comprises a serial shift register.

5. Apparatus for generating test signals for an engraving amplifier of the type used in an electromechanical gravure engraving apparatus according to claim 1, wherein said means for generating a digitized ramp signal comprises a counter coupled to a latch, said latch being enabled to periodically supply the output of said counter to said means for generating a serial data stream.

* * * * *